United States Patent
Metzger et al.

(10) Patent No.: US 12,145,462 B2
(45) Date of Patent: Nov. 19, 2024

(54) METHOD FOR CHARGING A TRACTION BATTERY OF AN ELECTRIC VEHICLE BY MEANS OF A CHARGING COLUMN AND CHARGING SYSTEM

(71) Applicant: Dr. Ing. h.c. F. Porsche Aktiengesellschaft, Stuttgart (DE)

(72) Inventors: Christian Metzger, Tamm (DE); Maximilian Lang, Stuttgart (DE); Matthias Neu, Mainz (DE)

(73) Assignee: Dr. Ing. h. c. F. Porsche AG, Essex Falls (DE)

( * ) Notice: Subject to any disclaimer, the term of this patent is extended or adjusted under 35 U.S.C. 154(b) by 524 days.

(21) Appl. No.: 17/494,780

(22) Filed: Oct. 5, 2021

(65) Prior Publication Data

US 2022/0105823 A1     Apr. 7, 2022

(30) Foreign Application Priority Data

Oct. 5, 2020 (DE) ..................... 10 2020 125 970.0

(51) Int. Cl.
*H02J 7/00* (2006.01)
*B60L 53/62* (2019.01)
*B60L 53/66* (2019.01)
*B60L 58/12* (2019.01)

(52) U.S. Cl.
CPC ............. *B60L 53/62* (2019.02); *B60L 53/66* (2019.02); *B60L 58/12* (2019.02); *H02J 7/00032* (2020.01); *H02J 7/0047* (2013.01); *H02J 7/007182* (2020.01)

(58) Field of Classification Search
None
See application file for complete search history.

(56) References Cited

U.S. PATENT DOCUMENTS

| | | | | |
|---|---|---|---|---|
| 5,739,667 | A | * | 4/1998 | Matsuda ........... H02J 7/007182 320/128 |
| 2016/0052411 | A1 | * | 2/2016 | Tanabe ............... H02J 7/00047 320/109 |
| 2019/0039467 | A1 | * | 2/2019 | Hortop ................. H02J 7/0071 |
| 2019/0070971 | A1 | | 3/2019 | Kusumi et al. |
| 2019/0241085 | A1 | | 8/2019 | Hiroe |

FOREIGN PATENT DOCUMENTS

| | | |
|---|---|---|
| DE | 10 2018 000 490 | 7/2018 |
| DE | 10 2019 007 868 | 7/2020 |

OTHER PUBLICATIONS

"Handshaking" in Wikipedia, [https://en.wikipedia.org/w/index.php?-title=Handshaking&oldid+976763985], heruntergeladen am Jun. 29, 2021.
German Search Report of Jun. 30, 2021.

* cited by examiner

*Primary Examiner* — Arun C Williams
(74) *Attorney, Agent, or Firm* — Gerald E. Hespos; Michael J Porco

(57) ABSTRACT

A method for charging a traction battery (1) of an electric vehicle b a charging column (2) is provided. The traction battery (1) can be charged at two or more different charging voltage levels. After the electric vehicle has been connected to the charging column (2), data is exchanged between a battery management system (3) of the electric vehicle and the charging column (2) to negotiate a charging voltage. For this purpose, a maximum permissible total charging voltage is communicated to the charging station (2) by the battery management system (3) via a battery handshake message (BHM) (4). The communicated maximum permissible total charging voltage is lower than a highest charging voltage level of the traction battery (1) by a defined measure.

15 Claims, 1 Drawing Sheet

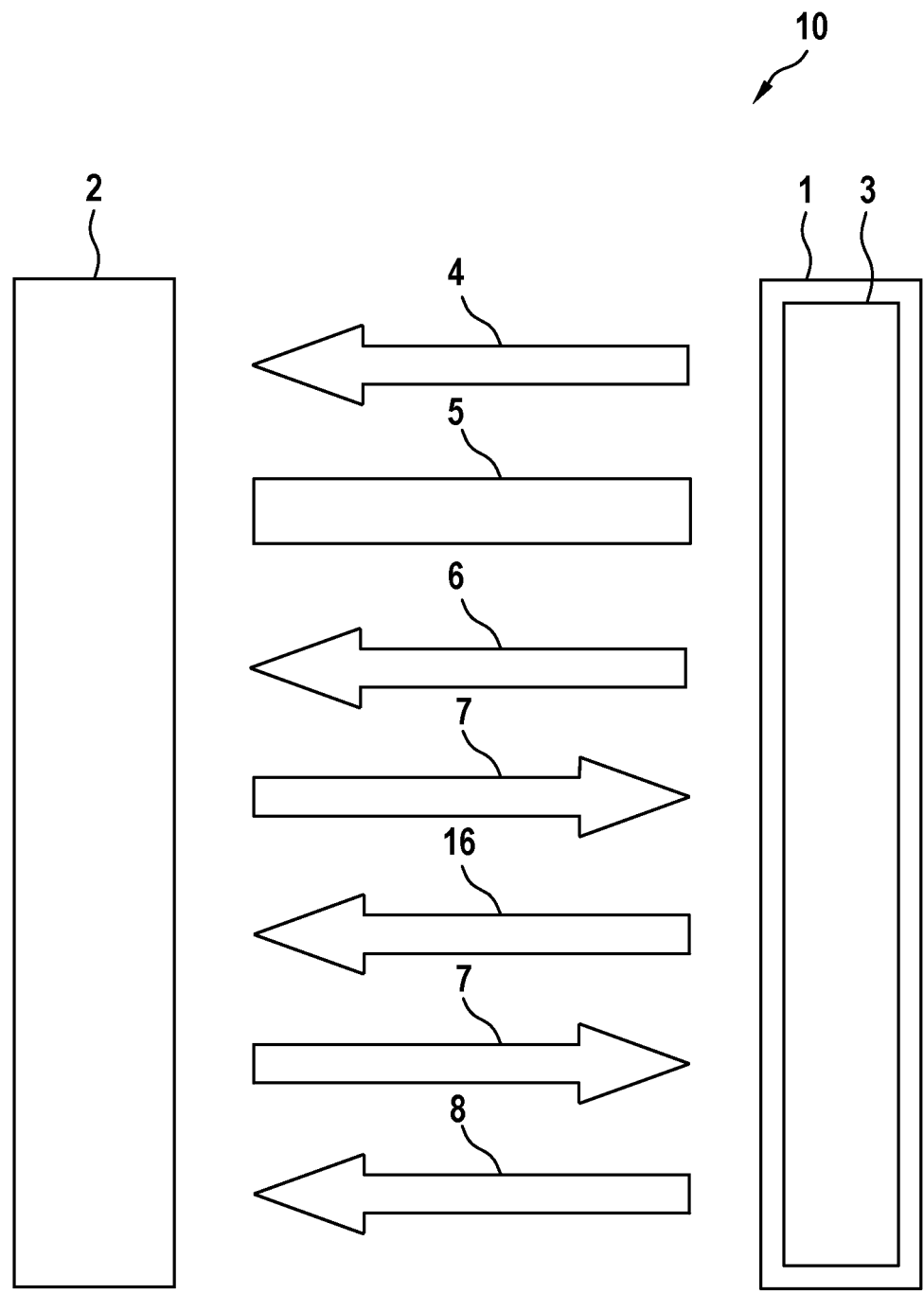

METHOD FOR CHARGING A TRACTION BATTERY OF AN ELECTRIC VEHICLE BY MEANS OF A CHARGING COLUMN AND CHARGING SYSTEM

CROSS REFERENCE TO RELATED APPLICATION

This application claims priority under 35 USC 119 to German Patent Appl. No. 10 2020 125 970.0 filed on Oct. 5, 2020, the entire disclosure of which is incorporated herein by reference.

BACKGROUND

Field of the Invention

The invention relates to a method for charging a traction battery of an electric vehicle by means of a charging column so that the traction battery can be charged at at least two different charging voltage levels.

Related Art

Traction batteries of electric vehicles increasingly are being operated with electric currents at a DC voltage level of 800 V to provide electric vehicles with high ranges and low weights due to low cable cross sections. However, electric currents at a DC voltage level of 400 V usually are provided for charging stations.

The prior art includes electric vehicles with a power electronics system that make it possible to charge vehicles at a voltage level of 800 V at a charging station at a lower voltage level of, for example, 400 V. However, such a power electronics system reduces the efficiency of the charging process and potentially limits the performance.

Charging stations that can also handle higher voltage levels have been proposed. However, this entails significant problems since some of the standards to be taken into account for charging stations do not permit higher voltage levels or a switchover between two different voltage levels within the context of the charging process.

For example, charging columns in accordance with the GB/T charging standards only permit a charging voltage level of 400 V. More particularly, the GB/T standards 18487.1-2015 and 27930-2015 for DC charging of electric vehicles make provision for vehicles to operate only at a fixed voltage level of 400 V and do not permit an automatic switchover between two voltage levels during a charging process. When an electric vehicle then requests a higher charging voltage, the charging column moves to an error mode and charging is no longer possible. A further problem is that a first insulation test, for example at the voltage level 400 V, and a subsequent charging at the voltage level 800 V (and an insulation monitoring procedure adapted thereto) is not normally covered by these standards.

It is therefore an object of this invention to improve interoperability of charging stations, in particular in accordance with the GB/T standard, and electric vehicles that support a plurality of voltage levels. In this case, a safe and uncomplicated switchover of the charging parameters during the charging process, in particular taking into account relevant norms, and, for example, the GB/T standard for charging stations is intended to be possible. Further advantages and features of the present invention will emerge from the general description and from the description of the exemplary embodiment.

SUMMARY

One aspect of the invention relates to a method for charging a traction battery of an electric vehicle by means of a charging column so that the traction battery can be charged at two or more different charging voltage levels. The method includes connecting at least one charging cable to the electric vehicle and to the charging column and then exchanging data between a battery management system of the electric vehicle and the charging column to negotiate a charging voltage. For this purpose, a maximum permissible total charging voltage is communicated to the charging station by the battery management system by means of at least one battery handshake message (BHM). In this case, the communicated maximum permissible total charging voltage is lower than a highest charging voltage level of the traction battery by a defined amount.

The method affords numerous advantages. For example, the battery handshake message at the charging voltage level of the traction battery that has been decreased in a targeted manner prevents error messages arising when a vehicle at a voltage level of 800 V registers at a charging station according to the GB/T standard. As a result, a switchover of the voltage level on the part of the charging column is also reliably possible, and the overall charging process is made possible or significantly improved. This is because, without such a switchover, the maximum charging power of the charging station is usually not exhausted or technically limited, since the GB/T standard permits only uncooled charging cables, which often have a maximum current-carrying capability of 250 A. This method affords a particular advantage when the charging voltage level is higher than the voltage for the insulation test.

In some embodiments, the communicated maximum permissible total charging voltage is reduced to a value that corresponds to the lower or lowest charging voltage level of the traction battery. In particular, the permissible total charging voltage may be reduced to 400 V. Other total charging voltages are also possible. As a result, the charging process at charging columns in accordance with the GB/T standard is significantly improved.

In some embodiments, the communicated maximum permissible total charging voltage is reduced to a value that is stored in the battery management system for the currently connected charging station. In particular, the communicated maximum permissible total charging voltage is 400 V+/−10% or +/−20%. In particular, the value to which the communicated maximum permissible total charging voltage is reduced is selected depending on a standard of the charging column. The value to which the communicated maximum permissible total charging voltage is reduced may correspond to a (maximum) voltage level, predetermined by the charging column, for an insulation test and preferably for a first or initial insulation test.

At least one measurement variable may be stipulated for an insulation test for the upcoming charging process. In particular, a minimum of the communicated maximum permissible total charging voltage and of an insulation strength of the charging column stored in the charging column is determined for this purpose. The insulation strength of the charging column and of the components thereof is determined by way of previous configuration. The insulation test for the upcoming charging process then may be carried out by the charging column taking into account this previously stipulated measurement variable.

In some embodiments, a (first) battery charging parameter (BCP) message about a maximum voltage of the traction battery is transmitted by the battery management system to the charging station. In this case, a value for the maximum voltage may be communicated to the charging station, and the value may be lower than an actual maximum voltage of the traction battery by a defined amount. In this case, a value that corresponds to the value of the lower charging voltage level of the traction battery may be communicated. The actual maximum voltage of the traction battery may be reduced by the same amount as is provided for the reduction of the maximum permissible total charging voltage. It is possible that for this purpose the same value as for the communicated maximum permissible total charging voltage is communicated to the charging column. In particular, the message is evaluated by the charging station.

At least one message about a maximum output capacity (CML) of a charger may be transmitted to the battery management system by the charging station, and the message may be evaluated by the battery management system.

At least one further battery charging parameter (BCP) message about a maximum voltage of the traction battery may be transmitted to the charging station by the battery management system. In this case, a value for the maximum voltage that is communicated to the charging station may correspond to the (actual) maximum voltage of the traction battery when this is lower than or equal to the maximum output capacity (CML) of the charger communicated by the charging station. A value for the maximum voltage that is communicated to the charging station may correspond to a lower charging voltage level of the traction battery when the (actual) maximum voltage of the traction battery is greater than the maximum output capacity (CML) of the charger communicated by the charging station. This message is evaluated by the charging station.

The battery management system can repeatedly transmit further battery charging parameter (BCP) messages to the charging station to negotiate a charging voltage. In particular, the charging station responds in each case with a communication of the maximum output capacity (CML) of the charger to the battery management system. In particular, the maximum output capacity (CML) of the charger is at least 800 V and preferably at least 900 V and, for example, 950 V+/−10%.

Messages about a maximum output capacity (CML) of a charger are transmitted repeatedly by the charging station to the battery management system until the battery management system no longer transmits further battery charging parameter (BCP) messages and/or until at least one message that the battery management system is battery charging ready (BRO) is received by the charging station.

The last received value for the maximum voltage of the traction battery from the battery charging parameter (BCP) message transmitted by the battery management system is stored by the charging station and used as a limit for the charging voltage for the present charging process. This stored value corresponds to the negotiated charging voltage. In particular, a charging voltage of the charging voltage level of 800 V is negotiated.

The charging process of some embodiments is not interrupted by the charging station during and/or after the procedure of the previously described steps. An interruption is possible when a required or stored time-out time is exceeded.

In all of the configurations, the charging voltage negotiated for the current charging process may be used by the charging station for at least one (continuous) insulation monitoring procedure during the charging process and/or for at least one further insulation test. In particular, an insulation monitoring procedure may take place during the charging process may be adapted to the charging voltage used.

In one aspect of the method, provision is made for a (first) battery charging parameter (BCP) message about a maximum voltage of the traction battery to be transmitted to the charging station by the battery management system. In this case, a value for the maximum voltage that is communicated to the charging station may correspond to a lower charging voltage level of the traction battery and/or to a charging voltage level of 400 V when a maximum output capacity (CML) of the charger communicated previously by the charging station is lower than the voltage taken into account for an insulation test.

The previously posed object can be achieved using such a method. This method affords a particular advantage when the charging voltage level is designed to be lower than the voltage for the insulation test.

At least one further battery charging parameter (BCP) message about a maximum voltage of the battery may be transmitted by the battery management system to the charging station to negotiate a charging voltage that is higher than the maximum voltage communicated in the previously transmitted (first) battery charging parameter (BCP) message, but lower than or equal to the maximum output capacity (CML) of the charger communicated previously by the charging station.

The invention also relates to charging system that is suited and designed to be operated according to the method according to the invention or one of the configurations. The charging system affords many advantages as described with respect to the disclosed method.

The charging system of some embodiments comprises at least one battery management system for a traction battery of an electric vehicle that can be charged at two or more different charging voltage levels. In particular, the charging system comprises at least one charging column that can be coupled to the battery management system. In particular, the battery management system is coupled to the charging column by the connection of a charging cable of the charging column to the electric vehicle as intended.

In accordance with the invention, a charging voltage level is understood to mean a voltage range in which the traction battery can be charged. For example, the charging voltage during charging can deviate from the voltage level +/−10% or +/−20% for technical reasons. In accordance with the invention, a voltage level is understood to mean a voltage range in which the traction battery is in operation as intended. For example, a battery having a voltage level of 800 V thus has between approximately 750 and approximately 850 V depending on the state of charge of the battery. Thus, the traction battery can be charged at least at two different charging voltage levels.

Within the context of the invention, a lower charging voltage level of the traction battery is understood to mean a charging voltage level other than the highest charging voltage level and preferably the lowest charging voltage level. In the event that more than two and, for example, three or more charging voltage levels are provided for the traction battery, the lower charging voltage level of the traction battery is understood to mean a charging voltage level that is at 400 V and/or that does not exceed a charging voltage standard provided for the respective charging column.

In particular, the lower (lowest) charging voltage level may be at 400 V and at least one other charging voltage level is at 800 V. Other voltage levels are also possible. It is possible that the charging voltage for the charging process deviates by up to 10% or 20% from the provided charging voltage level.

The battery management system and the charging column send the messages cyclically and preferably independently of one another. In particular, a transmitted message is evaluated by the respective receiver. In particular, the data exchange is initiated using the battery handshake message (BHM). In all of the configurations, it is particularly preferred that the data exchange takes place in accordance with J1939.

Further advantages and features of the invention will emerge from the exemplary embodiment discussed below with reference to the appended FIGURE.

BRIEF DESCRIPTION OF THE DRAWINGS

FIG. 1 is a schematic illustration of a charging system of the invention.

DETAILED DESCRIPTION

FIG. 1 shows a charging system 10 according to the invention that is operated in accordance with the method according to the invention. The charging system 10 is used to charge a traction battery 1 of an electric vehicle, which is not shown in more detail here. An on-board electrical system having a voltage level of, for example, 800 V can be supplied with electrical energy using the traction battery 1. The traction battery 1 can be charged in this case at two charging voltage levels and, for example, at 400 V and 800 V. The actual charging voltage is then produced according to the state of charge or overall state of the traction battery 1 between 350 V and 450 V or between approximately 700 V and 900 V.

A charging column 2 is provided with a charging cable, which is not shown in any more detail here to charge the traction battery 1. To make safe and reliable charging possible, the charging column 2 and a battery management system 3 of the motor vehicle communicate with one another continuously during the charging process. In this case processing of a J1939 communication between the charging column 2 and the battery management system 3 takes place. In particular, the insulation of the electrical components is monitored over the entire charging process.

An exemplary procedure of the method according to the invention is described in the following text with reference to FIG. 1 for a case in which a charging voltage level is higher than a voltage for an insulation test 5:

The battery handshake message BHM 4 of the battery management system 3 uses a message containing the signal maximum allowable total charging voltage, for example 400 V and is evaluated.

The charging column 2 knows, owing to previous configuration, which insulation strengths all of the connected components of the charging column 2 have.

The minimum of this signal, that is to say maximum allowable total charging voltage and the set insulation strength, is determined and stipulated as measurement variable for this charging process.

Based on the earlier evaluation, the charging column 2 will carry out an insulation test 5 using said measurement variable.

The first battery charging parameter BCP message 6 of the battery management system 3, said message containing the signal maximum voltage, for example 400 V, and is evaluated.

The message CML 7 is transmitted by the charging station 2, said message containing the signal maximum output voltage, for example 950 V.

Evaluation and acceptance of the subsequent further battery charging parameter BCP message 16 of the battery management system 3, with the message containing the signal maximum voltage, for example 800 V.

Repeated transmission of the message CML 7 of the charging station 2, with the message containing the signal maximum output voltage, for example 950 V. This takes place until the battery management system 3 no longer transmits the message BCP 16 and the message BRO 8 is received by the charging station 2.

The signal value maximum voltage last received in the battery charging parameter BCP message 16 of the battery management system 3 is stored and further used for the current charging process as a limit, for example 800 V.

During or after the procedure of the described steps, the charging process is not interrupted or terminated by the charging station 2, unless the normatively required time-out time is exceeded.

An exemplary procedure of the method according to the invention is described in the following text for a case in which the charging voltage level is lower than the voltage for the insulation test 5:

Evaluation of the battery handshake message BHM 4 of the battery management system 3 is evaluated and contains the signal maximum allowable total charging voltage, for example 800 V.

The charging column 2 knows, owing to previous configuration, the insulation strengths all of the connected components of the charging column 2.

The minimum of this signal, that is to say maximum allowable total charging voltage and the set insulation strength, is determined and stipulated as measurement variable for this charging process.

Based on the earlier evaluation, the charging column 2 will carry out an insulation test 5 using the measurement variable.

The first battery charging parameter BCP message 6 of the battery management system 3 contains the signal maximum voltage, for example 800 V, and is evaluated.

The message CML 7 by the charging station 2 is transmitted and contains the signal maximum output voltage, for example 500 V.

The subsequent further battery charging parameter BCP message 16 of the battery management system 3 contains the signal maximum voltage, for example 400 V, and this method is evaluated and accepted.

The message CML 7 of the charging station 2 is transmitted repeatedly and contains the signal maximum output voltage, for example 500 V. This takes place until the battery management system 3 no longer transmits the message BCP 16 and/or the message BRO 8 is received by the charging station 2.

The signal value maximum voltage last received in the battery charging parameter BCP message 16 of the battery management system 3 is stored and further used for the current charging process as a limit, for example 500 V.

During or after the procedure of the described steps, the charging process is not interrupted or terminated by the charging station 2, unless the normatively required time-out time is exceeded.

The invention presented here offers a significant increase in the interoperability of charging stations 2 with vehicles whose traction batteries 1 support a plurality of voltage levels. At the same time, optimization of the charging process on the part of the charging station 2 with respect to charging power and efficiency is made possible.

What is claimed is:

1. A method for charging a traction battery of an electric vehicle by a charging column, wherein the traction battery can be charged at one of at least two different charging voltage levels, the method comprising: connecting the electric vehicle to the charging column; exchanging data between a battery management system of the electric vehicle and the charging column to negotiate a charging voltage, the exchanging of data including communicating at least one battery handshake message from the battery management system to the charging station and communicating to the charging station a maximum permissible total charging voltage that is lower than a highest charging voltage level of the traction battery by a defined amount; and transmitting from the battery management system to the charging station at least one further battery charging parameter message about a maximum voltage of the traction battery, the at least one further battery charging parameter message about the maximum voltage of the traction battery corresponding to either;

the maximum voltage of the traction battery when the maximum voltage of the traction battery is lower than or equal to the maximum output capacity of the charger communicated by the charging station, or a lower charging voltage level of the traction battery when the maximum voltage of the traction battery is greater than the maximum output capacity of the charger communicated by the charging station.

2. The method of claim 1, wherein the communicated maximum permissible total charging voltage is reduced to a value that corresponds to a lower of the at least two charging voltage levels.

3. The method of claim 1, wherein the communicated maximum permissible total charging voltage is reduced to a value that is stored in the battery management system for the respectively connected charging station and wherein the communicated maximum permissible total charging voltage is 400 volts+/−10%.

4. The method of claim 1, wherein the method further comprises performing an insulation test and wherein a measurement variable for the insulation test is stipulated for the charging process in accordance with a minimum of the communicated maximum permissible total charging voltage and an insulation strength of the charging column stored in the charging column, and wherein the insulation test for the upcoming charging process is carried out by the charging column taking into account the previously stipulated measurement variable.

5. The method of claim 1, further comprising transmitting from the battery management system to the charging station a battery charging parameter message about a maximum voltage of the traction battery that is lower than an actual maximum voltage of the traction battery by a defined amount corresponding to the value of the lower charging voltage level of the traction battery.

6. The method of claim 1, further comprising transmitting from the charging station to the battery management system a message about a maximum output capacity of a charger and carrying out an evaluation of the message by the battery management system.

7. The method of claim 1, further comprising repeatedly transmitting from the charging station to the battery management system messages about maximum output capacity of the charging station until the battery management system no longer transmits further battery charging parameter messages and/or until a message that the battery management system is battery charging ready is received by the charging station.

8. The method of claim 1, wherein the last received value for the maximum voltage of the traction battery from the battery charging parameter message transmitted by the battery management system is stored by the charging station and used as a limit for the charging voltage for the current charging process.

9. The method of claim 1, wherein the charging voltage negotiated for the current charging process is used by the charging station for at least one insulation monitoring procedure during the charging process.

10. The method of claim 1, wherein a battery charging parameter message about a maximum voltage of the traction battery is transmitted by the battery management system to the charging station and wherein a value for the maximum voltage corresponds to a lower charging voltage level of the traction battery when a maximum output capacity of the charging station communicated previously by the charging station is lower than the voltage taken into account for an insulation test.

11. The method of claim 1, wherein at least one further battery charging parameter message about a maximum voltage of the traction battery is transmitted by the battery management system to the charging station to negotiate a charging voltage that is higher than the maximum voltage communicated in the previously transmitted battery charging parameter message, but lower than or equal to the maximum output capacity of the charging station communicated previously by the charging station.

12. A charging system configured to be operated in accordance with the method of claim 1.

13. A method for charging a traction battery of an electric vehicle by a charging column, wherein the traction battery can be charged at one of at least two different charging voltage levels, the method comprising: connecting the electric vehicle to the charging column; exchanging data between a battery management system of the electric vehicle and the charging column to negotiate a charging voltage, the exchanging of data including communicating at least one battery handshake message from the battery management system to the charging station and communicating to the charging station a maximum permissible total charging voltage that is lower than a highest charging voltage level of the traction battery by a defined amount, and wherein the communicated maximum permissible total charging voltage is reduced to a value that is stored in the battery management system for the respectively connected charging station and wherein the communicated maximum permissible total charging voltage is 400 volts+/−10%.

14. The method of claim 13, wherein the method further comprises performing an insulation test and wherein a measurement variable for the insulation test is stipulated for the charging process in accordance with a minimum of the communicated maximum permissible total charging voltage and an insulation strength of the charging column stored in the charging column, and wherein the insulation test for the upcoming charging process is carried out by the charging column taking into account the previously stipulated measurement variable.

15. The method of claim 13, wherein the charging voltage negotiated for the current charging process is used by the charging station for at least one insulation monitoring procedure during the charging process.

* * * * *